United States Patent
Linsky et al.

(10) Patent No.: US 6,452,962 B1
(45) Date of Patent: Sep. 17, 2002

(54) MITIGATION OF CO-CHANNEL INTERFERENCE IN SYNCHRONIZATION BURSTS IN A MULTI-BEAM COMMUNICATION SYSTEM

(75) Inventors: Stuart T. Linsky, San Pedro; Gregory S. Caso, Hermosa Beach; David A. Wright, Solana Beach, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/330,441

(22) Filed: Jun. 11, 1999

(51) Int. Cl.[7] .................................................. H04B 1/69
(52) U.S. Cl. ........................................ 375/145; 370/350
(58) Field of Search ............................... 375/141, 144, 375/367, 145, 148, 149; 370/316, 317, 320, 350, 515

(56) References Cited

U.S. PATENT DOCUMENTS

| | | | | |
|---|---|---|---|---|
| 5,619,503 A | * | 4/1997 | Dent | 370/330 |
| 5,920,591 A | * | 7/1999 | Fukasawa et al. | 375/148 |
| 6,144,645 A | * | 11/2000 | Struhsaker et al. | 370/280 |
| 6,240,072 B1 | * | 5/2001 | Lo et al. | 370/316 |

* cited by examiner

*Primary Examiner*—Don N. Vo
(74) *Attorney, Agent, or Firm*—McAndrews, Held & Malloy, Ltd.

(57) ABSTRACT

In a cellular satellite system such as Astrolink, where same frequency, same polarization (same "color") signals are used in multiple ground cells, there exists the possibility of interference and false reception of uplink Synchronization Bursts (SB) in systems employing TDMA access of the frequency in question. In such systems, a SB transmitted from one terminal may be received in more than one satellite beam. The reception of the signal from a terminal in an undesired beam (330) is erroneous and may adversely impact the time synchronization (360) of the desired terminal. For example, a system may employ Maximal Length (ML) Pseudo-Noise (PN) sequences (410) for its SBs wherein every beam may use the same sequence. To minimize false reception, the ML PN sequences (410) of each SB may be cyclicly shifted a different amount for each beam to generate sequences (410, 420) having low corsscorrelation with each other. By choosing ML PN codes having low crosscorrelation (410, 420) for the different beams, the interference from undesired beams may be minimized (530).

18 Claims, 7 Drawing Sheets

MITIGATION OF CO-CHANNEL INTERFERENCE IN SYNCHRONIZATION BURSTS IN A MULTI-BEAM COMMUNICATION SYSTEM

BACKGROUND OF THE INVENTION

The present invention generally relates to a method for improving synchronization between a satellite and a user terminal in a TDMA communications system. More particularly, the present invention relates to a method for minimizing the effect of co-channel interference between the TDMA synchronization bursts of a multi-beam communication system.

In a multi-beam processing satellite system, same frequency, same polarization signals may be used in multiple beams. Beams using the same frequency, same polarization signals are referred to as same "color" beams. In communications systems that do not employ polarization, beams sharing the same portion of the frequency spectrum are referred to as same color beams.

Considering two same color beams A and B, a portion of the signal from beam B may, at times, be observed in beam A as unwanted co-channel interference (CCI). For example, CCI may occur in beam B if beam A is operating at a very high transmit power in order, for instance, to overcome interference it is experiencing from users in other cells. CCI arises primarily because of the practical limitations in implementing an antenna system. Ideally, the antenna system would provide perfect rejection of same-color signals from other than the desired beam. However, in actual implementations, the coverage provided by beam A will inevitably provide some response to signals originating in beam B and vice-versa.

Many multi-beam satellite systems typically employ TDMA (time division multiple access) on the uplink to permit several user terminals to time share a frequency channel. In TDMA, a single frequency channel is typically shared among a number of users by assigning time slots to each user. Transmission bursts for each user occur within that user's assigned time slot.

TDMA requires that all user terminals maintain precise synchronization so that their uplink bursts arrive at the satellite in a non-overlapping fashion. As part of the activity required to maintain synchronization, each user terminal may send, from time to time, an overt synchronization burst (SB) in a time slot and on a frequency channel dedicated to the user terminal. The satellite processes the SB and compares its time of arrival to its own timing so that the user terminal may be apprised of whether it's timing is early or late relative to the satellites.

In previous systems, every same color beam used the same SB. Consequently, when an SB in a same color interfering beam (for example, beam B) aligned in time with the SB for a same color beam A, the signal from B coupled (interfered with) into the signal from A. Consequently, since the signal structure for both beams A and B was identical, the CCI from B was boosted to the same extent as the SB from A at the antenna for receiving A.

Consequently, any timing error in the user terminal transmitting beam B coupled into the processing electronics for beam A. The coupling resulted in false early/late decisions for beam A. Similarly, the SB from A also created a false early/late decision for beam B.

Thus, a need has long existed for a method to minimize CCI in uplink beams of a communications satellite system to minimize false reception of a synchronization burst.

SUMMARY OF THE INVENTION

One object of the present invention is to reduce co-channel interference (CCI). Another object is to allow highly reliable maintenance of time synchronization between a satellite and a terminal. Another object is to allow highly reliable maintenance of time synchronization between a satellite and a terminal in a Time-Division Multiple Access (TDMA) satellite communication system.

Another objective of the present invention is to minimize the cost and complexity of hardware used to mitigate the co-channel interference in synchronization in a satellite communication system.

One or more of the foregoing objects are met in whole or in part by a method for mitigating Co-Channel Interference (CCI) between synchronization bursts (SB) in a multi-beam communication system. The present invention uses different pseudorandom noise (PN) sequences among each of the various same-color beams. In particular, different phases of the same maximal length (ML) sequence may be used in each same color beam. Because two SBs based on differing phases of an ML sequence have a small cross correlation, SB CCI between the same color beams is minimized at the receiver. A correlation boost is provided in the processing electronics for beam A when the electronics receive the SB for beam A. However, due to the low cross correlation between SBs, the processing electronics for beam A do not provide a correlation boost to CCI generated by beam B. Timing errors from beam B are therefore not coupled into the measurements made for beam A. As a result, the timing error derived for beam A is much more reliable.

These and other features of the present invention are discussed or apparent in the following detailed description of the preferred embodiments of the invention.

BRIEF DESCRIPTION OF THE DRAWINGS

FIG. 4 shows the correlation properties of a shifted 63-bit Maximal Length (ML) Pseudorandom Noise (PN) sequence.

DESCRIPTION OF THE PREFERRED EMBODIMENTS

Figure 7:
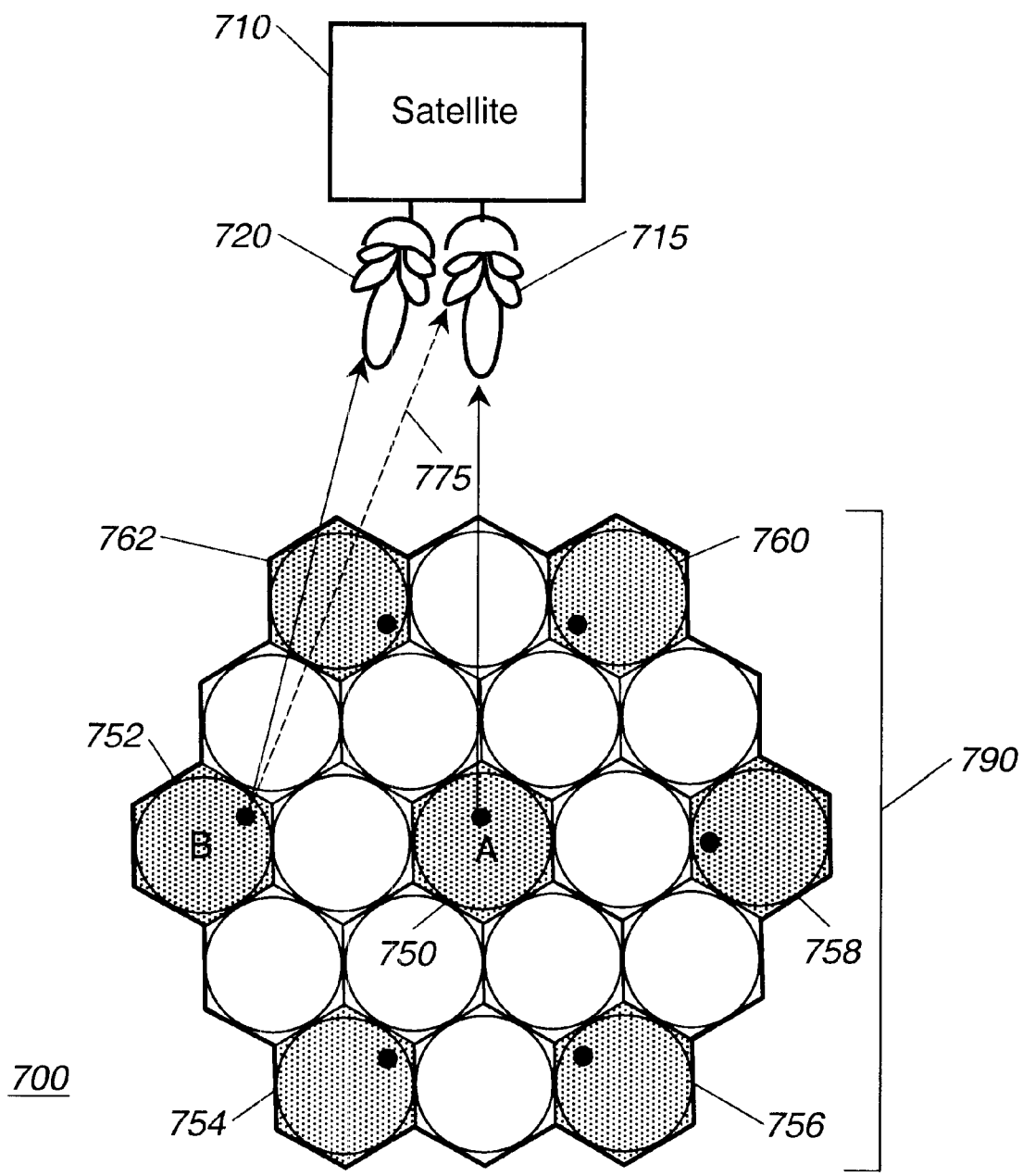
FIG. 7 illustrates an exemplary satellite communications system using same color beams.

Turning now to the drawings, FIG. 7 illustrates an exemplary satellite cellular communication system 700. The satellite cellular communication system 700 includes a satellite 710 which generates a Beam A 715 directed to a Cell A 750 (labeled "A") and a Beam B 720 directed to a Cell B 752 (labeled "B"). Cell A 750 and Cell B 752 are part of an exemplary frequency reuse pattern 790 including a number of cells positioned as shown. The frequency reuse pattern 790 includes a number of cells with same color beams (750–762).

FIG. 7 shows that multiple identically colored beams may exist in the frequency reuse pattern 790. For example, the Cell A 750 (supported by Beam A 715) and the Cell B 752 (supported by Beam B 720) share the same color. However, any beam may produce Co-Channel Interference (CCI) in another beam of the same color. For example, the interference of Beam B 720 in Beam A 715 is graphically illustrated as a dotted line 775 in FIG. 7. Furthermore, there may be numerous additional same color cells (750–762) in the frequency reuse plan 790. Thus, although the discussion below proceeds with reference to Beams A and B, the techniques discussed below are also applicable to numerous additional same color beams in any frequency reuse plan.

Figure 1:
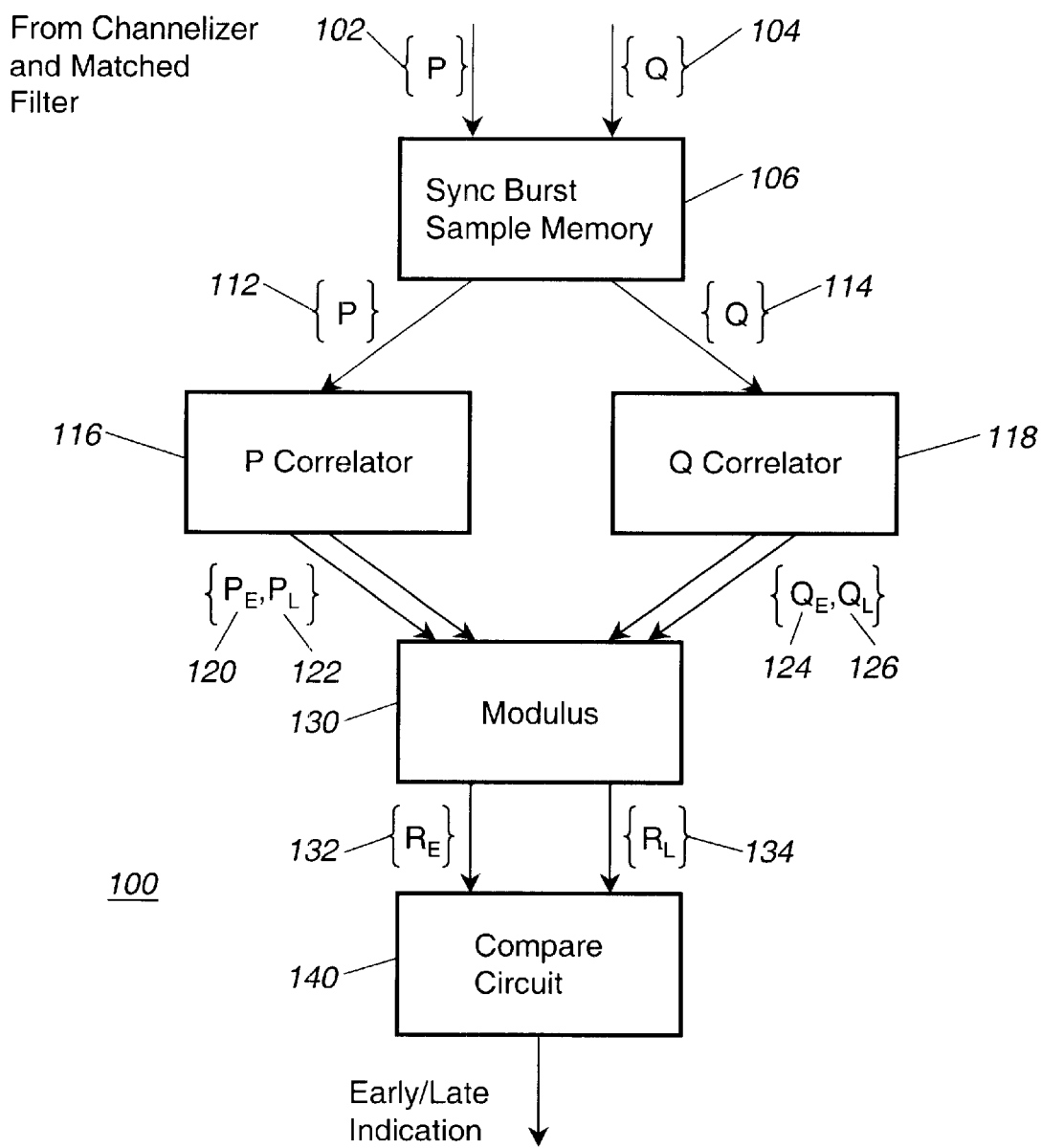
FIG. 1 illustrates a Synchronization Burst Processor (SBP) of the communications system of the present invention.

FIG. 1 illustrates a Synchronization Burst Processor (SBP) 100 of the communications system of the present invention. The SBP 100 includes a sync burst sample memory 106, a P component correlator 116, a Q component correlator 118, a modulus former 130, and a compare circuit 140. To maintain timing between the satellite and the terminal, the terminal occasionally sends a Synchronization Burst (SB) to the satellite. The SB may be in the form of Binary Phase-Shift Keyed (BPSK) symbols, for example.

The SBP 100 accepts timing information from the satellite's uplink timing system to coordinate its sampling and processing of the output of the satellite antenna's receive portion during the SB interval. The SBP 100 may receive from the output of the satellite antenna, for example, a sequence of sample pairs during the SB that represent the complex values of the BPSK symbols of the SB. Each sample pair may be separated into a P component 102 and a Q component 104 (the in-phase and quadrature components of the signal respectively). The sample pairs are stored in a sync burst sample memory 106 while the SBP is sampling the SB of the terminal.

Each sample pair is subsequently separated into its respective P component 112 and Q component 114. The P component 112 of each sample pair is sent to a P component correlator 116. The Q component 114 of each sample pair is sent to a Q component correlator 118. Each correlator correlates the sample pairs against a predetermined expected pattern of the SB. Two correlations are formed; one representing the correlation of the sample pairs against a one half symbol early expected SB and the other representing the correlation of the sample pairs against a one half symbol late expected SB.

The P component correlator 116 correlates the P component 112 of the SB against a known pattern representing a SB one half symbol early (one half symbol before the expected SB) and also correlates the P components 112 of the SB against a known pattern representing a SB one half symbol late (one half symbol after the expected SB). The Q component correlator 118 performs similar operations for the Q components 114 of the SB.

The P component correlator 116 produces the result, $P_E$ 120, of the correlation between the P component 112 and the expected early SB pattern. Similarly, $P_L$ 122 represents the result of the correlation between the P component 112 and the expected late SB. At the Q component correlator 118, the result of the correlation between the Q component 114 and the expected early SB is denoted $Q_E$ 124. The result of the correlation between the Q component 114 and the expected late SB is denoted $Q_L$ 126. As correlator outputs, $P_E$, $P_L$, $Q_E$, and $Q_L$ each may represent an integer value.

$P_E$, $P_L$, $Q_E$, and $Q_L$ are combined at a modulator 130 to form the modulus of the SB for both the early and late cases. The modulus of two integers is formed by squaring the integers, adding the resultant values together and then taking the square root. The modulus of the early components, $P_E$ and $Q_E$, is denoted $R_E$ 132. The modulus of the late components, $P_L$ and $Q_L$, is denoted $R_L$ 134.

$R_E$ 132 and $R_L$ 134 are then compared at the compare circuit 140. If $R_E$ 132 is greater than $R_L$ 134 by a predetermined threshold, the compare circuit 140 transmits a late signal to the user terminal to alert the user terminal to align its timing synchronization to that of the satellite. As an example, if $R_E$ 132 is less than $R_L$ 134, the compare circuit 140 transmits a signal indicating that the SB was early. The early/late signals may indicate that the terminal should adjust its timing by a timing quantum, typically a small fraction of a symbol epoch.

Figure 2A:
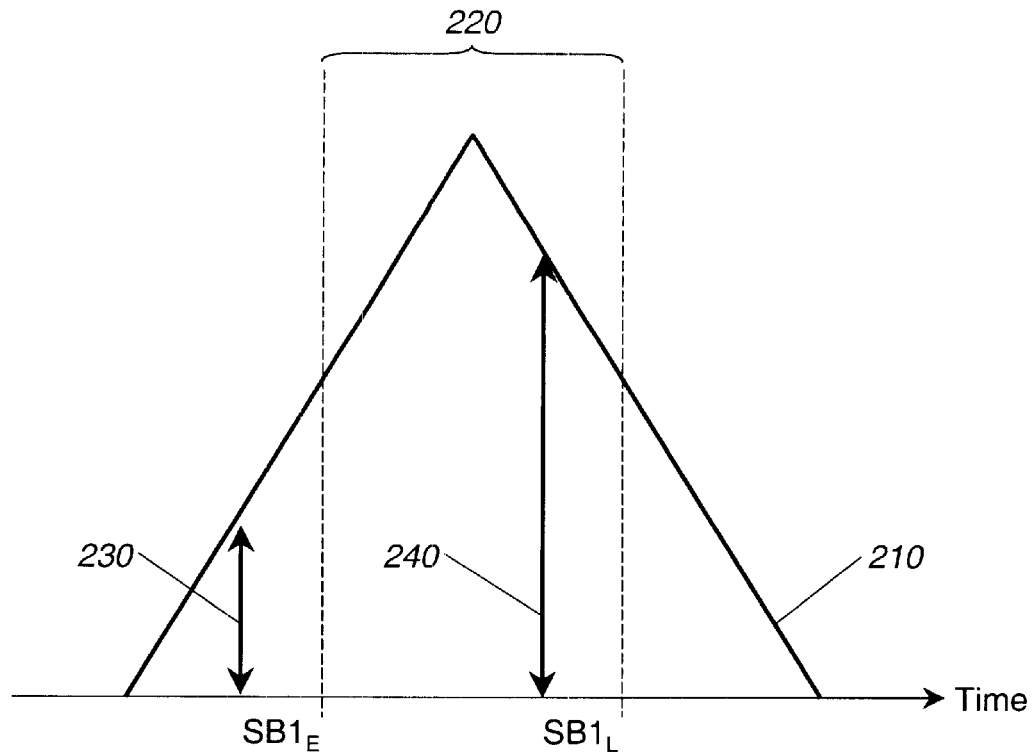
FIG. 2A shows the response of the correlation of the SBP to an early Synchronization Burst (SB).
Figure 2B:
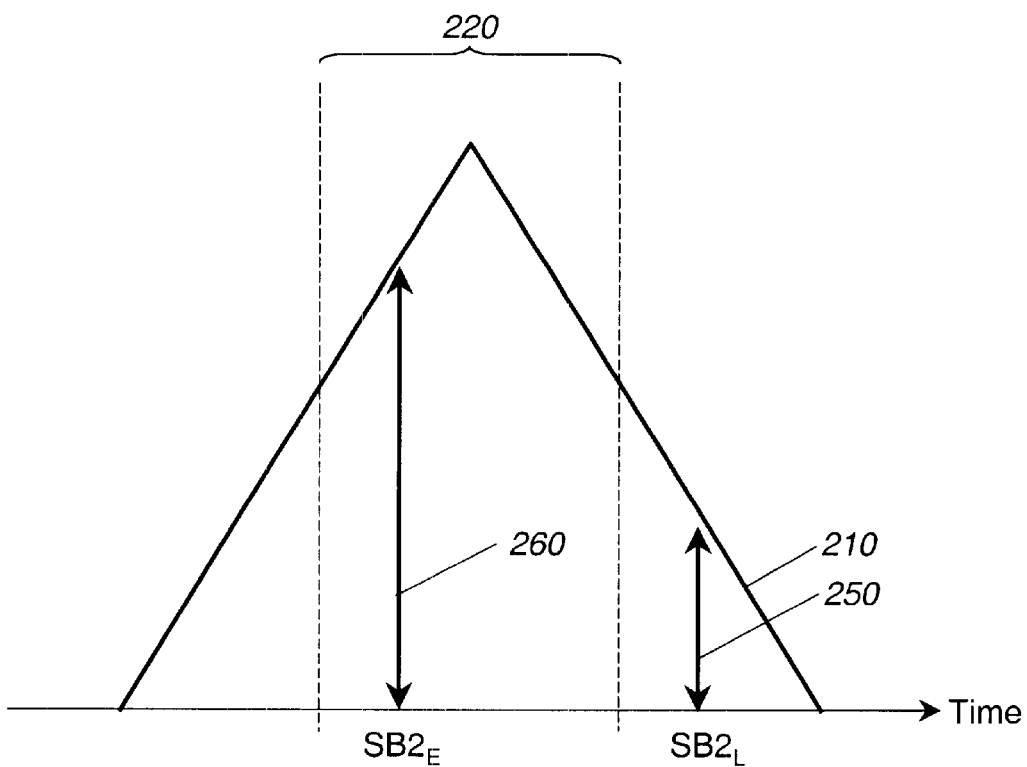
FIG. 2B shows the response of the correlation of the SBP to a late SB.

FIG. 2A and FIG. 2B illustrate the response of the correlation of the SBP 100 to two exemplary SBs. FIG. 2A shows the correlator response 210 as well as an early correlation 230 and a late correlation 240 of an exemplary SB denoted SB1 and a dashed line 220 indicating the point at which the early and late correlations would be equal. The horizontal base of the triangular correlator response 210 may be thought of as a time axis with increasing time to the right. The triangular shape of the response of the correlator response 210 of the SB is for the exemplary case of rectangular phase shift keyed signals and a matched filter. The response of the correlation may have other shapes depending upon the specific system.

FIG. 2A shows a case where the exemplary SB denoted SB1 is early. The dashed lines 220 indicate the points at the correlator response 210 which yields early and late correlations of equal magnitude (i.e. the SB would arrive precisely on time). In FIG. 2A, the early correlation of SB1 ($SB1_E$) 230 is much less than the late correlation of SB1 ($SB1_L$) 240. Thus the compare circuit 140 transmits a signal to the user terminal that the SB was received too early. In FIG. 2B, the late correlation of SB2 ($SB2_L$) 250 is much less than the early correlation of SB2 ($SB2_E$) 260. Thus the compare circuit 140 transmits a signal to the user terminal that the SB was received too late.

Figure 3:
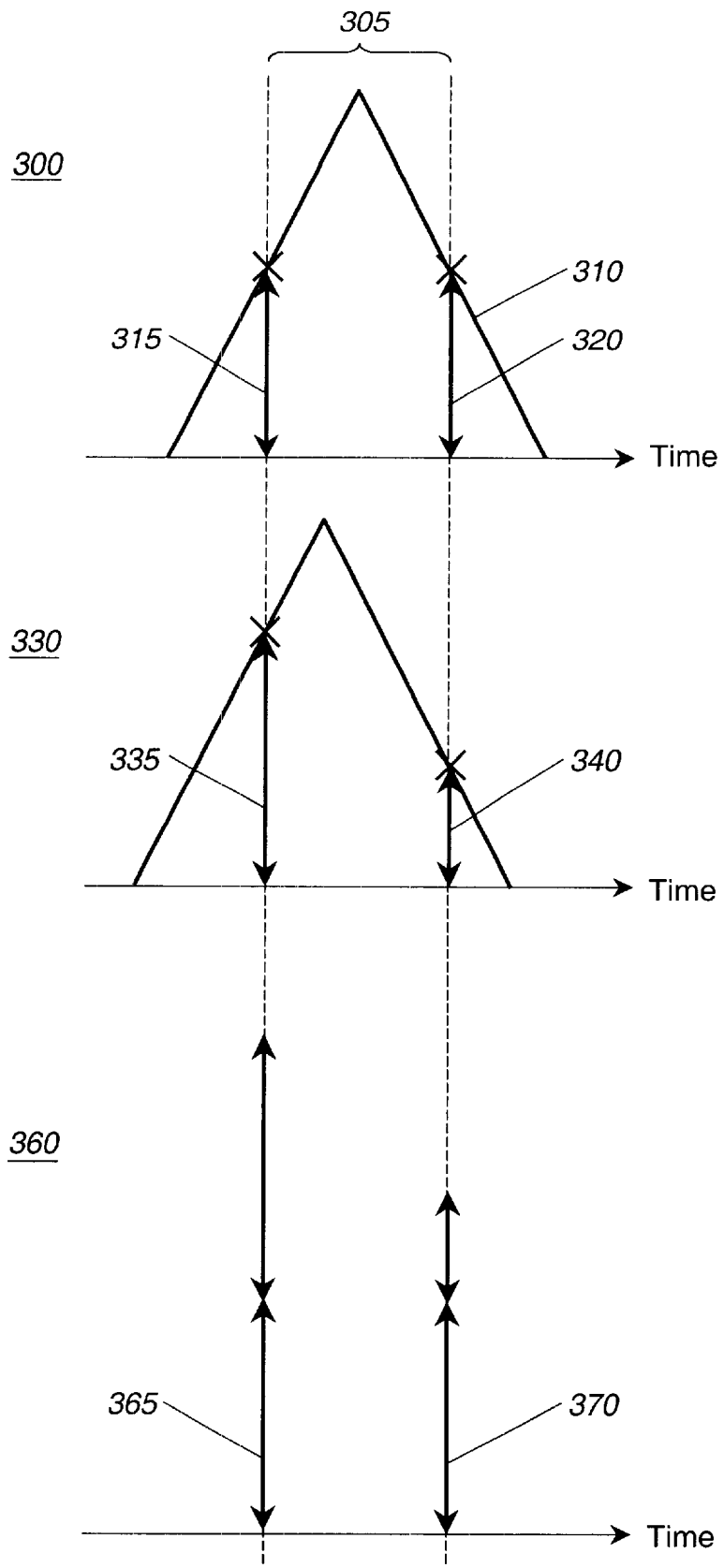
FIG. 3 depicts the response of the correlator to a desired SB, an undesired SB, and the combined response of the correlator of the present invention.

FIG. 3 shows the response of the correlator to an on-time, desired SB 300, an undesired CCI SB 330, and the combined response 360. For all responses, the dashed lines 305 indicate the point at which the correlator response 310 for the desired SB yields early and late signals of equal magnitude The on-time SB 300 includes an early correlation 315 and a late correlation 320, both of which are of equal magnitude. Thus, the timing needs no correction. However, for the reasons explained above, the on-time SB and an undesired CCI SB may be coupled into the correlator of the desired SB and produce an undesired timing signal.

As shown in the undesired CCI SB 330, the magnitude of the early correlation 335 is less than the magnitude of the late correlation 340 and thus the SB is early. The correlator is unable to separate the coupled contributions of the on-time SB 300 and the undesired CCI SB 330 because they result from same color beams and use the same SB structure.

Thus, the correlator outputs a combined response 360 in which the early correlation 365 is less than the late correlation 370. Consequently, an early signal is sent to the user terminal of the on-time SB 300. This early signal may have the effect of worsening the timing synchronization of the on-time SB 300 because the on-time SB 300 was originally correct. However, the early signal to the user terminal may cause an undesired shift in time synchronization due to the coupled correlation of the on-time SB 300 and the undesired CCI SB 330.

In order to reduce the effect of the undesired CCI SB 330 on the time synchronization of the on-time SB, the present invention reduces the correlation of the undesired CCI SB 330 to the on-time SB 300. The technique of the present invention has the effect of making the response of the interferer, B, appear noise like, as seen in the correlator for the resident signal A, resulting in a lower propensity for the timing errors of the interference B to influence the SB response of the resident user A. This effect is achieved by using low cross-correlation pseudo-noise maximal length sequences for the SBs.

Typically, the SB is a Psuedorandom Noise (PN) sequence formed from a ML (maximal length) sequence that may be produced using a linear feedback shift register whose feedback arrangement corresponds to a primitive binary polynomial. In forming the early/late measurement, the satellite may correlate the received SB against its known sequence structure to boost the signal to noise ratio of the variables on which the timing error estimate is based.

Figure 4:
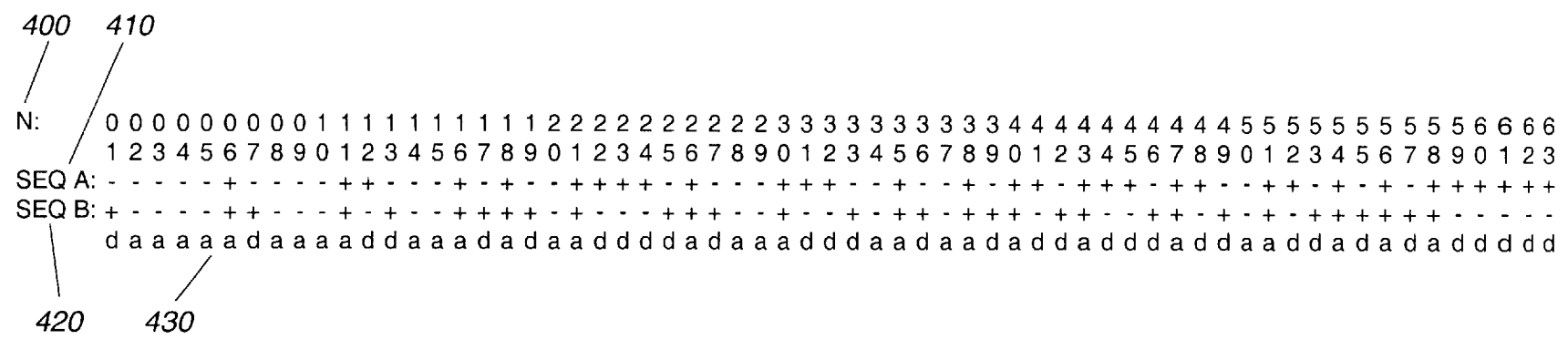

FIG. 4 illustrates a Pseudorandom Noise (PN) sequence formed, for example, from the class of Maximal Length (ML) sequences. FIG. 4 includes a numerical index 400, a PN ML sequence A 410, a PN ML sequence B 420, and an indicator 430 as to the agreement and disagreement between the sequences. The sequences in FIG. 4 may be produced using a linear feedback shift register whose feedback arrangement corresponds to a primitive binary polynomial.

FIG. 4 is an illustration of two N length PN ML codes where N=63. The numerical index 400 indicates the positions of the N=63 elements of the ML code. The sequence A 410 is the original ML code and is associated with the primitive polynomial $x^6+x^1+x^0$ which may be produced, for example, from a 6 stage shift register and a single XOR (exclusive-OR logic gate). The sequence B 420 is the Sequence A 410 with a cyclic shift of five positions. That is, N(6) of Sequence A 410 becomes N(1) of Sequence B 420 and the sequences proceed thereafter, with N(59) of Sequence B 420 wrapping around to take the value of N(1) of Sequence A 410. Beneath Sequences A 410 and B 420 is an indicator 430 as to whether Sequence A 410 and B 420 agree (signified by "a") or disagree (signified by "d") for that N. This agreement/disagreement indicator 430 illustrates the low cross-correlation between Sequences A 410 and B 420 in that the two sequences can be seen to agree in 31 places and disagree in 32. Thus, by cyclicly shifting the ML PN sequence, the desired SB and the undesired CCI SB are made to have a low cross correlation. Thus, the response of the desired SB's correlator to the undesired CCI SB will be minimized. Sequence A 410 and sequence B 420 may be generated in practice using, for example, the various phases of an ML sequence produced from a shift register and varying the starting states.

In general, any two phases (cyclic shifts) of an ML sequence of length $N=2^m-1$ have the property that they differ in (N+1)/2 places, and agree in (N−1)/2 places. Since the number of agreements and disagreements is nearly equal, two waveforms derived from sequences based on differing phases of the same ML sequence have a small cross correlation when they are time aligned at the symbol level.

Figure 5:
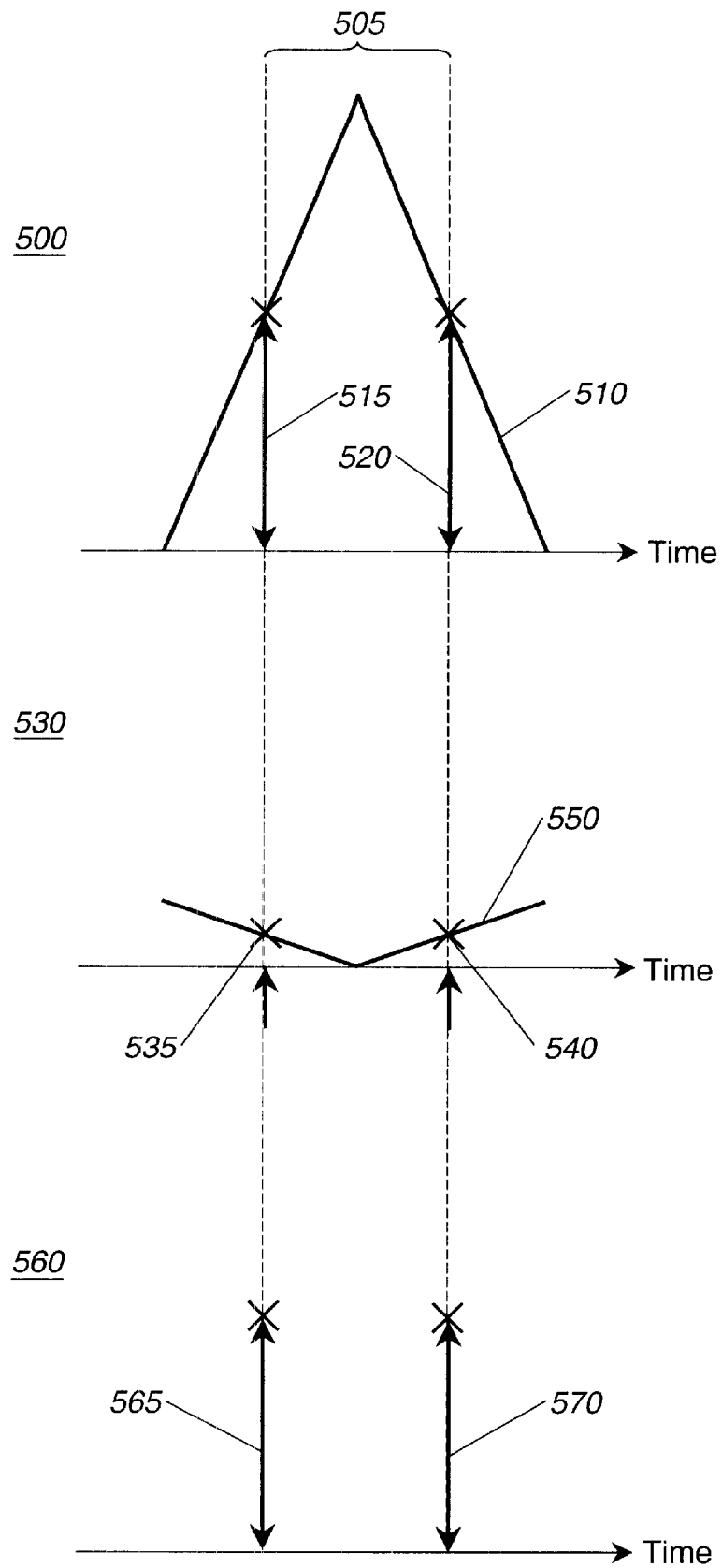
FIG. 5 illustrates the response, with the implementation of low crosscorrelation SBs, of the correlator to a desired SB, an undesired SB, and the combined response of the correlator.

FIG. 5 illustrates the response of the desired SB's correlator to the desired SB 500, the response of the desired SB's correlator to the undesired CCI SB 530, and the combined response 560 with the implementation of the low cross correlation cyclicly shifted ML PN sequence for the undesired CCI SB 530. As in FIG. 3, for all responses, the dashed lines 505 indicate the point at which the correlator response 510 for the desired SB yields early and late signals of equal magnitudes.

The on-time SB 500 includes an early correlation 515 and a late correlation 520, both of which are of equal magnitude. Thus, the timing needs no correction.

In the correlation of the undesired CCI SB 530, the magnitude of both the early correlation 535 and the late correlation 540 are very small compared to the early portion 515 and late portion 520 of the desired SB's correlator 500 regardless of the timing error of the interfering SB. The correlation response 550 of the undesired CCI SB 530 has a different shape because of the low cross correlation of the PN ML sequences of the on-time SB and undesired CCI SB. The combined response 560 of the correlator has an early portion 565 and a late portion 570 of virtually the same magnitude as the response of the on-time SB 300, that is, equal magnitude. Thus, no undesired early or late signal will be sent to the user terminal.

Figure 6:
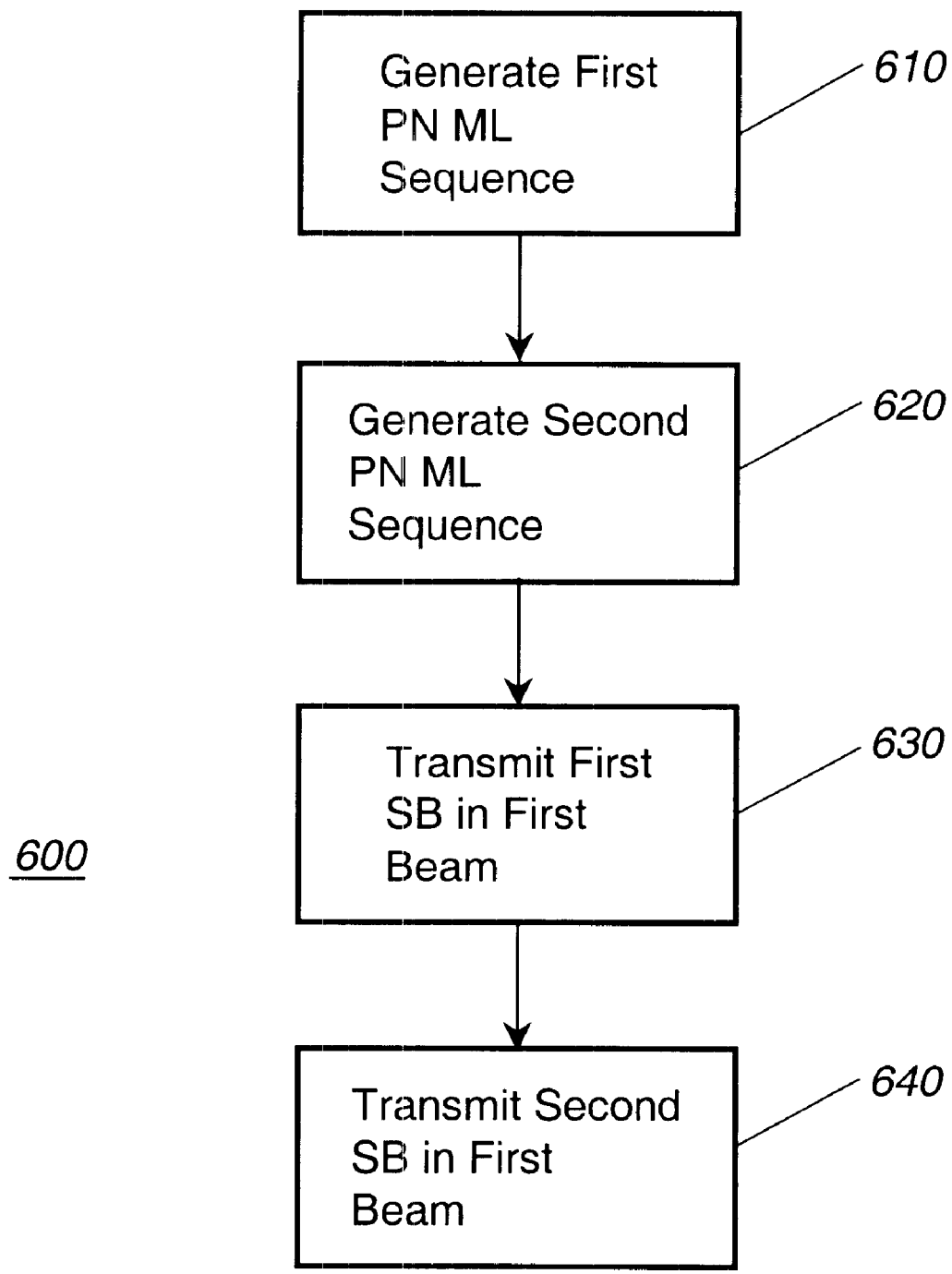
FIG. 6 shows a flowchart of an exemplary implementation of the present invention.

FIG. 6 shows a flowchart of an exemplary implementation 600 of the present invention. First, a first PN ML sequence is generated 610. Next, a second PN ML sequence is generated 620. The second PN ML sequence may, for example, by formed by cyclically shifting the first PN ML sequence by a predetermined number of positions. Next, a first SB is transmitted in a first beam 630. The first SB is comprised of the first PN ML sequence. Finally, a second SB is transmitted in a second beam 640 of the same color as the first beam. The second SB is comprised of the second PN ML sequence.

In a typical system, many same color beams may exist. For each same color beam, a single ML PN sequence may be provided and shifted by a different amount (for up to N different same color beams.)

The present invention thus mitigates the CCI between SB of same color beams. As a result, a satellite communication system more accurately synchronizes with a user terminal. The effects of the undesired CCI SB is minimized. The present invention may also be implemented efficiently, and thus lowers the cost and complexity of a satellite while improving reliability. Furthermore, the present invention may be expanded to provide low cross correlation ML PN sequences for up to N same color beams using the same ML PN sequence.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A method for mitigating Co-Channel Interference (CCI) in a Synchronization Burst (SB) of a satellite communications system having a plurality of beams, at least two of said beams of the same color, the method comprising the steps of:

providing a first pseudorandom noise (PN) sequence;

providing a second PN sequence having a low cross correlation with said first PN sequence;

transmitting a first SB comprised of said first PN sequence to a satellite within a first beam of a first color; and transmitting a second SB comprised of said second PN sequence to said satellite within a second beam of said first color.

2. The method of claim 1 wherein said step of providing a first PN sequence comprises the step of providing a first Maximal Length (ML) PN sequence.

3. The method of claim 2 wherein said step of providing a second PN sequence comprises the step of providing a second ML PN having a low cross correlation with said first ML PN sequence.

4. The method of claim 3 wherein said step of providing a second ML PN sequence further comprises the step of cyclically shifting said first ML PN sequence by a predetermined number of positions.

5. The method of claim 2 wherein said step of providing a first ML PN sequence comprises generating said first ML PN sequence in a feedback shift register.

6. The method of claim 3 further comprising the steps of:
   providing a plurality of additional ML PN sequences having low cross correlation; and
   transmitting a plurality of SBs comprised of said plurality of ML PN sequences to said satellite within a plurality of beams of the same color as said first beam.

7. A user terminal providing enhanced mitigation of Co-Channel Interference (CCI) in a Synchronization Burst (SB), said user terminal comprising:
   a memory storing a first pseudorandom noise (PN) sequence and a second PN sequence with a low cross correlation with said first PN sequence;
   a first transmitter generating a first uplink of a first color and transmitting SBs comprised of said first PN sequence in said first uplink; and
   a second transmitter generating a second uplink of said first color and transmitting SBs comprised of said second PN sequence in said second uplink.

8. The user terminal of claim 7 further comprising a linear feedback shift register for generating said first PN sequence.

9. The user terminal of claim 7 wherein said first and second PN sequences are Maximal Length (ML) sequences.

10. The user terminal of claim 7 wherein said first and second PN sequences are PN ML sequences and said second PN ML sequence is generated by cyclically shifting said first PN ML sequence.

11. The user terminal of claim 7 further comprising:
   at least one additional low cross correlation PN sequence; and
   at least one additional transmitter generating an additional uplink of the same color as said first uplink, said additional transmitter transmitting SBs comprised of said additional PN sequence in said additional uplink.

12. The user terminal of claim 11 wherein said additional low cross correlation PN sequence comprises a Maximal Length (ML) sequence.

13. The user terminal of claim 12 wherein said additional low cross correlation ML PN sequence is generated by cyclically shifting said first PN sequence.

14. A satellite communications system providing enhanced mitigation of Co-Channel Interference (CCI) in a Synchronization Burst (SB), said satellite communications system comprising:
   a first user terminal comprising a first pseudorandom noise (PN) sequence and a first transmitter;
   a second user terminal comprising a second PN sequence having a low cross correlation with said first PN sequence and a second transmitter;
   wherein said first transmitter generates SBs comprised of said first PN sequence in a first uplink of a first color; and
   wherein said second transmitter generates SBs comprised of said second PN sequence in a second uplink of said first color.

15. The satellite communications system of claim 1 further comprising a satellite, said satellite comprising:
   a receiver for receiving said SBs in at least said first uplink;
   a correlator outputting one of an early and late status signal in response to said SBs; and
   a transmitter for transmitting a timing correction based on said status signal to at least said first user terminal.

16. The satellite communication system of claim 15 including a plurality of receivers and a plurality of correlators disposed at the satellite, each said receiver and correlator in a given color utilizing a different SB sequence.

17. The satellite communications system of claim 14 wherein said first and second PN sequences are Maximal Length (ML) sequences.

18. The satellite communications system of claim 14 wherein said first and second PN sequences are PN ML sequences and said second PN ML sequence is a cyclic shift of said first PN ML sequence.

* * * * *